(12) United States Patent
Yoshimoto

(10) Patent No.: US 8,560,488 B2
(45) Date of Patent: Oct. 15, 2013

(54) PATTERN DETERMINATION DEVICES, METHODS, AND PROGRAMS

(75) Inventor: Seiji Yoshimoto, Minato-ku (JP)

(73) Assignee: NEC Corporation, Tokyo (JP)

( * ) Notice: Subject to any disclaimer, the term of this patent is extended or adjusted under 35 U.S.C. 154(b) by 339 days.

(21) Appl. No.: 13/055,105

(22) PCT Filed: May 29, 2009

(86) PCT No.: PCT/JP2009/059850
§ 371 (c)(1),
(2), (4) Date: Jan. 20, 2011

(87) PCT Pub. No.: WO2010/016313
PCT Pub. Date: Feb. 11, 2010

(65) Prior Publication Data
US 2011/0131169 A1    Jun. 2, 2011

(30) Foreign Application Priority Data

Aug. 8, 2008    (JP) ................................. 2008-205456

(51) Int. Cl.
*G06N 5/02*    (2006.01)

(52) U.S. Cl.
USPC ............................................ 706/52; 706/13

(58) Field of Classification Search
None
See application file for complete search history.

(56) References Cited

U.S. PATENT DOCUMENTS

| | | | | |
|---|---|---|---|---|
| 5,600,753 A | * | 2/1997 | Iso | 704/200 |
| 6,236,749 B1 | * | 5/2001 | Satonaka et al. | 382/154 |
| 2004/0103108 A1 | * | 5/2004 | Andreev et al. | 707/100 |
| 2005/0147302 A1 | * | 7/2005 | Leung | 382/190 |
| 2006/0155551 A1 | * | 7/2006 | Ueda | 705/1 |
| 2006/0204053 A1 | * | 9/2006 | Mori et al. | 382/118 |
| 2006/0284837 A1 | * | 12/2006 | Stenger et al. | 345/156 |
| 2007/0083368 A1 | * | 4/2007 | Handley | 704/245 |
| 2007/0160259 A1 | * | 7/2007 | Huang | 382/100 |
| 2007/0192308 A1 | * | 8/2007 | Wei et al. | 707/5 |
| 2008/0086493 A1 | * | 4/2008 | Zhu | 707/101 |
| 2011/0093419 A1 | * | 4/2011 | Huang | 706/13 |

FOREIGN PATENT DOCUMENTS

| | | | |
|---|---|---|---|
| JP | 2000-276459 A | 10/2000 | |
| JP | 2004-341930 A | 12/2004 | |
| JP | 2005-301789 A | 10/2005 | |
| JP | 2006-031114 A | 2/2006 | |
| JP | 2006-039658 A | 2/2006 | |

(Continued)

OTHER PUBLICATIONS

J. Funada, "Shimon Shogo Tokushu," NEC Technical Journal, Mar. 25, 2002, pp. 35-38, vol. 55, No. 3.

(Continued)

*Primary Examiner* — Jeffrey A Gaffin
*Assistant Examiner* — Dave Misir
(74) *Attorney, Agent, or Firm* — Sughrue Mion, PLLC

(57) ABSTRACT

A pattern determination device has probability computation means and dissimilarity decision means. The probability computation means computes an internal probability that is a probability in which a value of a predetermined component of a pattern that takes place according to a probability density distribution in a domain of an input pattern falls in a range between the value of said predetermined component of a pattern X (1) and the value of said predetermined component of a pattern X(2). The dissimilarity decision means decides a dissimilarity between said pattern X (1) and said pattern X (2) based on said internal probability computed by said probability computation means.

14 Claims, 2 Drawing Sheets

(56) References Cited

FOREIGN PATENT DOCUMENTS

| JP | 2006-350434 A | 12/2006 |
|---|---|---|
| JP | 2007-026068 A | 2/2007 |
| JP | 2007-102795 A | 4/2007 |

OTHER PUBLICATIONS

K. Beyer, et al., "When is "Nearest Neighbor" Meaningful?," Proceeding of the 7th International Conference on Database Theory, Lecture Notes in Computer Science, 1999, pp. 217-235, vol. 1540, Springer-Verlag, London.

T. Kamishima, "A Survey of Recent Clustering Methods for Data Mining (part 2)—Challenges to Conquer Giga Data Sets and The Curse of Dimensionality," The Japanese Society for Artificial intelligence, 2003, pp. 170-176, vol. 18, No. 2.

C.C. Aggarwal, et al., "On the Surprising Behavior of Distance Metrics in High Dimensional Space," Lecture Notes in Computer Science, 2001, pp. 1-15, vol. 1973, Springer.

\* cited by examiner

PATTERN DETERMINATION DEVICES, METHODS, AND PROGRAMS

CROSS REFERENCE TO RELATED APPLICATIONS

This application is a National Stage of International Application No. PCT/JP2009/059850 filed May 29, 2009, claiming priority based on Japanese Patent Application No. 2008-205456 filed Aug. 8, 2008, the contents of all of which are incorporated herein by reference in their entirety.

TECHNICAL FIELD

The present invention relates to techniques that determine similarities between patterns.

BACKGROUND ART

A technique called clustering that classifies patterns based on similarities between patterns is known. The clustering is a technique that is widely applied for fields such as image recognition, speech recognition, spectrum pattern classification, and data mining. In these application fields, patterns may not be always be input such that they can be easily compared. There are many situations in which, for instance, high dimensional patterns may be input, input patterns may be partly missed, and data may contain outliers. Thus, clustering needs to have high robustness against data missing and outliers and also needs to deal with high dimensional patterns.

As described above, one problem as to clustering is noises such as data missing and outliers. To satisfactorily perform clustering, noises are normally removed from input patterns in a pre-process. However, if data as a feature to be compared is partly missed or data contains outliers, it is not easy to remove such noises.

For instance, in fingerprint classification, features with respect to portions to be compared may not be always detected. In such a case, patterns need to be classified in the state in which features are partly missed. In addition, if there is an occlusion in image recognition, an image pattern including a partial image that is not a target to be compared may needs to be used for comparison. In speech recognition, it may be necessary to use a speech pattern, superimposed with a sudden and short-period noise, for comparison.

As one method that can enhance robustness upon clustering for patterns containing noises, there is an approach that uses an ordinal scale. Patent Document 1 describes a method that enhances robustness against changes of illumination intensities and so forth using an ordinal scale. On the other hand, Patent Document 2 discloses a method that deals with outliers by employing a voting method that uses inverse numbers of distances as similarities of the same categories.

As another problem as to clustering, the higher the dimensions of patterns, the lower the recognition accuracies of the patterns. This results from the fact that neighbor determination becomes unstable due to the spherical surface concentration phenomenon in high dimensional space. This situation is known as "the curse of dimensions" (refer to Non-Patent Document 1).

One method to avoid this problem is to reduce the number of dimensions. As techniques for reducing the number of dimensions, although principal component analysis, multidimensional scaling method, and so forth are often used, many other dimension reduction techniques have been proposed. Non-Patent Document 2 explains a typical method that effectively reduces the number of dimensions.

However, upon reduction of the number of dimensions, features suitable for pattern recognition may not always be selected. Thus, methods that improve clustering performances by changing pattern similarities or dissimilarities have been proposed.

Non-Patent Document 3 describes that neighbor determination accuracies are improved by using an $L_{1/k}$ norm (where k is an integer equal to or greater than 2) as the distance scale in D dimensional space instead of using an $L_2$ norm. On the other hand, Non-Patent Document 3 reports that robustness against noises are improved by using the $L_{1/k}$ norm.

RELATED ART DOCUMENTS

Patent Documents

Patent Document 1: JP2006-39658A
Patent Document 2: JP2004-341930A

Non-Patent Documents

Non-Patent Document 1: K. S. Beyer, J. Goldstein, R. Ramakrishnan, U. Shaft: When Is "Nearest Neighbor" Meaningful?, in Proceeding of the 7th International Conference on Database Theory, Lecture Notes In Computer Science, vol. 1540, pp. 217-235, Springer-Verlag, London, 1999.

Non-Patent Document 2: Toshihiro Kamishima, National Institute of Advanced Industrial Science and Technology (AIST), "A Survey of Recent Clustering Methods for Data Mining (part 2)—Challenges to Conquer Giga Data Sets and The Curse of Dimensionality—", The Japanese Society for Artificial intelligence, Vol. 18, No. 2, pp. 170-176, 2003.

Non-Patent Document 3: C. C. Aggarwal, A. Hinneburg, D. A. Keim: "On the Surprising Behavior of Distance Metrics in High Dimensional Space", Lecture Notes in Computer Science, Vol. 1973, Springer, 2001.

SUMMARY OF THE INVENTION

Problems to be Solved by the Invention

The method of Patent Document 1 obtains robustness against changes of illumination intensities by transforming dissimilarities into an ordinal scale. However, since ordinal relationships as large-small relationships of distances of high dimensional patterns containing outliers become unstable due to the spherical surface concentration phenomenon, this method is not suitable for high dimensional patterns.

The method disclosed in Patent Document 2 is an approach that detects data containing outliers in advance by using inverse numbers of distances. This method is a method applied to supervised learning in which categories of learning patterns are provided in advance. Although inverse numbers of distances may be used as an evaluation criterion with which patterns that belong to the same categories are compared, they are not able to be used to compare patterns that belong to different categories. Thus, this method is not able to be applied to unsupervised learning such as clustering.

The method presented in Non-Patent Document 3 uses as a distance of D-dimensional patterns, $X^{(1)}=(x^{(1)}_1, \ldots, x^{(1)}_D)$ and $X^{(2)}=(x^{(2)}_1, \ldots, x^{(2)}_D)$, instead of the $L_2$ norm:

[Formula 1]

$$d_2^{(D)}(X^{(1)}, X^{(2)}) = \sqrt{\sum_{i=1}^{D}(x_i^{(1)} - x_i^{(2)})^2} \quad (1)$$

$L_{1/k}$ norm (where k is an integer equal to or greater than 2)

[Formula 2]

$$d_{1/k}^{(D)}(X^{(1)}, X^{(2)}) = \left(\sum_{i=1}^{D}(x_i^{(1)} - x_i^{(1)})^{1/k}\right)^k \quad (2)$$

Thus, a method that improves neighbor determination accuracies of high dimensional patterns and robustness against noises is presented.

A method that uses the $L_1$ norm is often employed to enhance robustness against outliers; however, generally, the smaller the $\alpha$ of an $L_\alpha$ norm (where $\alpha$ is a positive real number), the higher is the robustness. This results from the property in which, as $\alpha$ becomes small, large distance data contributes less to the neighbor determination, thereby relatively decreasing the influence of outliers.

This property is also supposed to allow the $L_{1/k}$ norm to improve neighbor determination accuracies in high dimensions.

The reason why the neighbor determination of the $L_2$ norm becomes unstable is that small distance components of D-dimensional patterns contribute much less thereto than large distance components. Thus, the influence of minimal changes of large distance components such as outliers to the neighbor determination is greater than the contribution of small distance components thereto, resulting in causing the neighbor determination to be unstable. The higher the number of dimensions D, the higher is the probabilities that large distance components will arise. Thus, the probability that neighbor determination will become unstable is high in high dimensional patterns.

The reason why the $L_{1/k}$ norm improves the neighbor determination accuracies is thought that the contribution of large distance components to the norm is decreased.

However, there is a problem in which this method is not suitable for clustering of patterns containing missing values. When a distance $d_{1/k}^{(D)}(X^{(1)}, X^{(2)})$ of D-dimensional patterns $X^{(1)}=(x^{(1)}_1, \ldots, x^{(1)}_D)$ and $x^{(2)}=(x^{(2)}_1, \ldots, x^{(2)}_D)$ that belong to the same category and distances $d_{1/k}^{(D-d)}(X^{(1)'}, X^{(2)'})$ of D-d dimensional patterns $x^{(1)'}$ and $x^{(2)'}$ from which d components have been removed as missing values are compared, $d_{1/k}^{(D-d)}(X^{(1)'}, X^{(2)'}) \leq d_{1/k}^{(D)}(X^{(1)}, X^{(2)})$ is obtained. In other words, in the case that components contain data missing, their distances become shorter.

To allow a distance scale or dissimilarities to be applicable for data containing missing values, it is preferred that data containing missing values are determined to have lower similarities than data containing no missing values. In this evaluation criterion, however, it is likely that data containing missing values are determined to have higher similarities than data containing no missing values.

As described above, upon determining similarities between patterns, there are various problems that interfere with obtaining satisfactory clustering results. Thus, techniques that can satisfactorily determine similarities between patterns are needed.

An object of the present invention is to provide techniques that satisfactorily determine similarities between patterns.

Means for Solving the Problem

To accomplish the above-described object, a pattern determination device of one aspect of the present invention, comprises:

probability computation means that computes an internal probability that is the probability in which a value of a predetermined component of a pattern that takes place according to a probability density distribution in the domain of an input pattern falls in a range between the value of said predetermined component of a pattern X (1) and the value of said predetermined component of a pattern X(2); and dissimilarity decision means that decides a dissimilarity between said pattern X (1) and said pattern X (2) based on said internal probability computed by said probability computation means.

A pattern determination method of one aspect of the present invention, comprises:

computing an internal probability that is a probability in which the value of a predetermined component of a pattern that takes place according to the probability density distribution in the domain of an input pattern falls in a range between the value of said predetermined component of a pattern X (1) and the value of said predetermined component of a pattern X (2); and deciding a dissimilarity between said pattern X (1) and said pattern X (2) based on said internal probability computed by said probability computation means.

A program of one aspect of the present invention is a pattern determination program that is executed by a computer and that causes said computer to perform functions, comprising:

probability computation means that computes an internal probability that is a probability in which a value of a predetermined component of a pattern that takes place according to a probability density distribution in a domain of an input pattern falls in a range between the value of said predetermined component of a pattern X (1) and the value of said predetermined component of a pattern X (2); and dissimilarity decision means that decides a dissimilarity between said pattern X (1) and said pattern X (2) based on said internal probability computed by said probability computation means.

MODES FOR CARRYING OUT THE INVENTION

Embodiments of the present invention will be described in detail with reference to drawings.

First Embodiment

In a first embodiment, a pattern determination device that computes dissimilarities between patterns is instantiated.

Using computed dissimilarities, a plurality of patterns are clustered. A device that performs clustering includes the above-described pattern determination device.

Figure 1:
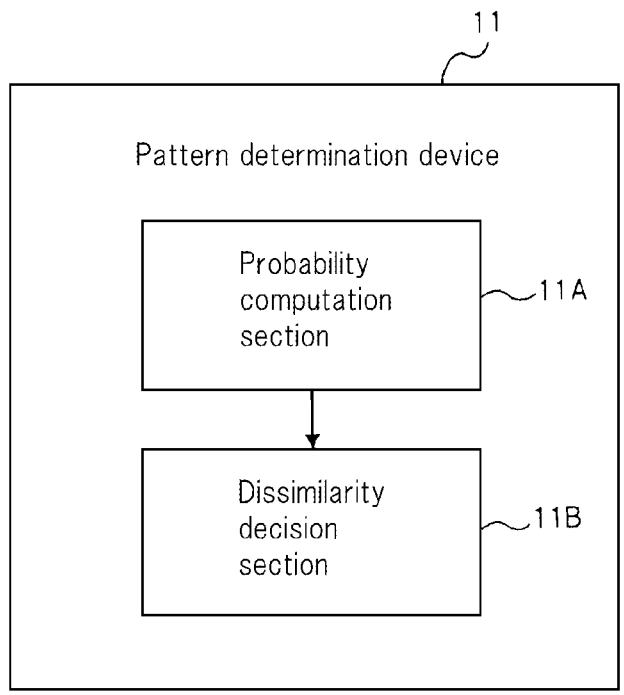
FIG. 1 is a block diagram showing the structure of a pattern determination device according to a first embodiment.

FIG. 1 is a block diagram showing the structure of the pattern determination device according to the first embodiment. Referring to FIG. 1, pattern determination device 11 has probability computation section 11A and dissimilarity decision section 11B.

Probability computation section 11A computes an internal probability that is a probability in which the value of a predetermined component of a pattern that takes place according to the probability density distribution in the domain of an input pattern falls in the range between the value of a predetermined component of a pattern $X^{(1)}$ and the value of a predetermined component of pattern $X^{(2)}$.

Then, probability computation section 11A virtually generates a pattern $X^{(3)}$ according to the probability density distribution in which the value of the predetermined component of the pattern in the domain takes place, determines whether or not the value of the predetermined component of the pattern $X^{(3)}$ falls in the range between the value of the predetermined component of the pattern $X^{(1)}$ and the value of the predetermined component of the pattern $X^{(2)}$, and computes the internal probability based on a plurality of determined results.

The patterns $X^{(1)}$, $X^{(2)}$, and $X^{(3)}$ are multi-dimensional patterns and probability computation section 11A individually computes the internal probabilities of the plurality of components.

Dissimilarity decision section 11B decides the dissimilarity of pattern $X^{(1)}$ and pattern $X^{(2)}$ based on the internal probabilities computed by probability computation section 11A. At that point, dissimilarity decision section 11B may designate, for instance, the sum of the logarithms of the plurality of internal probabilities corresponding to the individual components as a dissimilarity or the product of the plurality of internal probabilities as a dissimilarity.

If a particular component of pattern $X^{(1)}$ or pattern $X^{(2)}$ is a missing value, probability computation section 11A may designate the internal probability of the component as predetermined value 1. Alternatively, probability computation section 11A may use uniform random numbers as a probability density distribution.

Assuming that the patterns $X^{(1)}$, $X^{(2)}$ have D dimensions, they can be represented by patterns $X^{(1)}=(x^{(1)}_1, \ldots x^{(1)}_D)$, $X^{(2)}=(x^{(2)}_1, \ldots, x^{(2)}_D)$. On the other hand, the probability density distribution can be represented by $q_1(x_1), \ldots q_d(x_D)$.

Assuming that the virtually generated pattern is expressed as $X^{(3)}=(x^{(3)}_1, \ldots, x^{(3)}_D)$, a probability $p(x^{(1)}_i, x^{(2)}_i)$ in which each component of the pattern x(3) falls in the range of $x^{(1)}_i \leq x^{(3)}_i \leq x^{(2)}_i$: $i=1, \ldots D$ is an internal probability. When the sum of the logarithms of the internal probabilities of the individual components is designated as a dissimilarity, a dissimilarity $E^{(D)}(X^{(1)}, X^{(2)}) = \Sigma_{i=1}^{D} \ln p(x^{(1)}_i, x^{(2)}_i)$ is obtained. When $x^{(1)}_i$ or $x^{(2)}_i$ is a missing value, the probability $p(x^{(1)}_i, x^{(2)}_i)$ is designated as predetermined value 1.

In the following, further detail description will be presented.

In this embodiment, a probability $P(X^{(1)}, X^{(2)})$ in which each component $x^{(3)}_i$ of the pattern $X^{(3)}=(x^{(3)}_1, \ldots, x^{(3)}_D)$ virtually generated according to the probability density distribution $q_i(x)$: $i=1, \ldots, D$ for the two D-dimensional patterns $X^{(1)}$ and $X^{(2)}$ falls in the range of $x^{(1)}_i \leq x^{(3)}_i \leq x^{(2)}_i$ is computed and the dissimilarity of $X^{(1)}$ and $X^{(2)}$ is defined based on the probability. A probability $p(x^{(1)}_i, x^{(2)}_i)$ in which $x^{(3)}_i$ falls in $x^{(1)}_i \leq x^{(3)}_i \leq x^{(2)}_i$, is given by:

[Formula 3]

$$p(x_i^{(1)}, x_i^{(2)}) = \int_{min(x_i^{(1)}, x_i^{(1)})}^{max(x_i^{(1)}, x_i^{(1)})} q_i(x) dx \quad (3)$$

From this computed result, the probability $P(X^{(1)}, X^{(2)})$ in which all the components of $X^{(3)}$ fall in the range of the values of the components corresponding to $X^{(1)}$ and $X^{(2)}$ is given by

[Formula 4]

$$P(X^{(1)}, X^{(2)}) = \prod_{i=1}^{D} p(x_i^{(1)}, x_i^{(2)}) \quad (4)$$

A dissimilarity $E^{(D)}(X^{(1)}, X^{(2)})$ of $X^{(1)}$ and $X^{(2)}$ is defined by the logarithm of $P(X^{(1)}, X^{(2)})$, which is

[Formula 5]

$$E^{(D)}(X^{(1)}, X^{(2)}) \equiv \ln P(X^{(1)}, X^{(2)}) \quad (5)$$
$$= \ln\left(\prod_{i=1}^{D} p(x_i^{(1)}, x_i^{(2)})\right)$$
$$= \sum_{i=1}^{D} E_i(x^{(1)}, x^{(2)})$$

where $E_i(X^{(1)}, X^{(2)})$ represents the contribution of an i-th component to the dissimilarity:

[Formula 6]

$$E_i(X^{(1)}, X^{(2)}) = \ln p(x_i^{(1)}, x_i^{(2)})$$

From the Formula (4), the probability of which data randomly given in the domain of input data falls by coincidence between $X^{(1)}$ and $X^{(2)}$. It is thought that the lower are these probabilities, the smaller is the difference between $X^{(1)}$ and $X^{(2)}$, namely the more $X^{(1)}$ and $X^{(2)}$ become similar. In contrast, it is thought that the higher the probability obtained according to the Formula (4), the lower is the similarity of $X^{(1)}$ and $X^{(2)}$. Thus, in this embodiment, the logarithm of the probability of the Formula (4) is used for clustering as the dissimilarity of the two patterns $X^{(1)}$, $X^{(2)}$ (Formula (5)). In addition, an instance that uses the logarithm of the probability, (Formula (5)), defined by the Formula (4) as the dissimilarity was described; however, the probability expressed by Formula (4) may be used as the dissimilarity.

According to this embodiment, similarities between patterns can be satisfactorily determined. Thus, clustering can be performed with robustness against missing values and outliers and also can be performed for high dimension patterns.

In the following, the reason why clustering can be performed with robustness against missing values and outliers and also why it can be performed for high dimension patterns according to this embodiment will be described.

First, according to this embodiment, clustering can be satisfactorily performed for data containing missing values.

According to a method of this embodiment, the contribution of each component to the dissimilarity, (Formula (6)), is always 0 or a negative value, namely:

[Formula 7]

$$E_i(X^{(1)}, X^{(2)}) = \ln p(x_i^{(1)}, x_i^{(2)}) \leq 0 \quad (7)$$

In addition, when the probability of a component containing a missing value is designated as 1, the contribution of the component having the missing value to the dissimilarity, (Formula 5), becomes 0. Thus, the dissimilarity $E^{(D)}$ ($X^{(1)}$, $X^{(2)}$) of the two D-dimensional patterns $X^{(1)}$ and $X^{(2)}$ that do not contain missing values is always lower than the dissimilarity $E^{(D-d)}$ ($X^{(1)'}$, $X^{(2)'}$) of (D-d) dimensional patterns $X^{(1)'}$ and $X^{(2)'}$ in which d components have been removed from $X^{(1)}$ and $X^{(2)}$ as missing values. Thus, with respect to the dissimilarity of this embodiment, the similarity in which data contains a missing value is lower than that in which data does not contain a missing value. In other words, the desired property of $E^{(D-d)}$ ($X^{(1)'}$, $X^{(2)'}$)≥$E^{(D)}$ ($X^{(1)}$, $X^{(2)}$) can be obtained.

This property allows patterns to be correctly determined if features are partly missing, for instance, in fingerprint classification such that patterns that do not contain data missing are more similar than those that contain data missing.

Second, according to this embodiment, clustering can be performed with robustness against outliers.

The lower the dissimilarity (Formula (5)) of this embodiment, the higher is the similarity of two patterns. With respect to this point, this embodiment is the same as one that uses the $L_{1/k}$ norm $d_{1/k}$ ($X^{(1)}$, $X^{(2)}$) of Non-Patent Document 3. However, this embodiment is different from Non-Patent Document 3 in that, although the $L_{1/k}$ norm has a non-negative value, the dissimilarity $E^{(D)}$ ($X^{(1)}$, $X^{(2)}$) of this embodiment has a non-positive value.

$L_{1/k}$ evaluates the similarity of two patterns by imposing a penalty on a component having a value that is far from others. By contrast, with respect to the dissimilarity of this embodiment, similarities are evaluated such that a component having a value close to the others is highly scored. Thus, with respect to the $L_{1/k}$ norm (Formula (2)), components of outliers are most contributed in all components; with respect to the dissimilarity (Formula (5)) of this embodiment, components of outliers are least contributed in all the components according to the Formula (3) and Formula (6). With this property, using the dissimilarity of this embodiment, clustering that is less affected by outliers can be accomplished.

With this property, even if an image containing an occlusion is recognized, it is possible to decrease the contribution of a portion containing the occlusion which is not a target to be compared.

Third, according to this embodiment, clustering can be satisfactorily performed for high dimensional patterns.

The accuracy of high dimensional neighbor determination decreases due to the fact that a small distance component contributes much less to the similarity evaluation than a large distance component. With respect to the dissimilarity (Formula (5)) of this embodiment, since the smaller a component has a distance, the more it contributes to the dissimilarity, unstability of neighbor determination caused by the spherical surface concentration phenomenon can be prevented.

Thus, using the dissimilarity of this embodiment, clustering can be performed for high dimensional patterns, for example, spectrum patterns or the like.

Second Embodiment

In a second embodiment, a clustering device that computes the dissimilarity and performs clustering based thereon will be instantiated. Although a clustering method using the dissimilarity is not limited, an embodiment that creates a cluster tree from given data using the nearest neighbor method and outputs the cluster tree will be instantiated.

Figure 2:
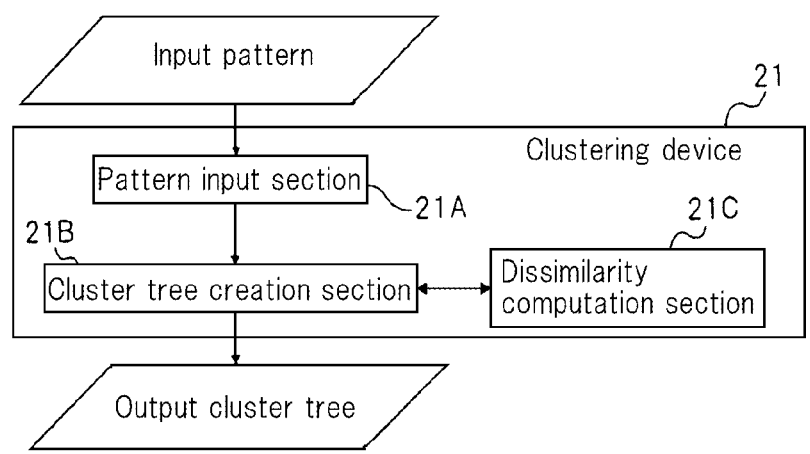
FIG. 2 is a block diagram showing the structure of a clustering device according to a second embodiment.

FIG. 2 is a block diagram showing the structure of the clustering device according to the second embodiment. Referring to FIG. 2, clustering device 21 has pattern input section 21A, cluster tree creation section 21B, and dissimilarity computation section 21C.

Pattern input section 21A reads input data from a file that stores, for instance, D dimensional input data, until there is no input data therein and supplies the input data to cluster tree creation section 21B.

Cluster tree creation section 21B creates an initial cluster from the input data obtained from pattern input section 21A and sets up dissimilarities between clusters through dissimilarity computation section 21C. The initial cluster is a cluster to be set up in an initial phase in which a cluster tree is created. The initial cluster may be, for instance, individual input data. Next, cluster tree creation section 21B creates a cluster tree by successively merging cluster pairs according to the nearest neighbor algorithm. Then, cluster tree creation section 21B outputs the obtained cluster tree.

Dissimilarity computation section 21C computes a dissimilarity $E_D$ ($X^{(m)}$, $X^{(n)}$) from a data pair ($X^{(m)}$, $X^{(n)}$) supplied from cluster tree creation section 21B according to Formula (5). Dissimilarity computation section 21C is provided with a function corresponding to pattern determination device 11 of the first embodiment.

Figure 3:
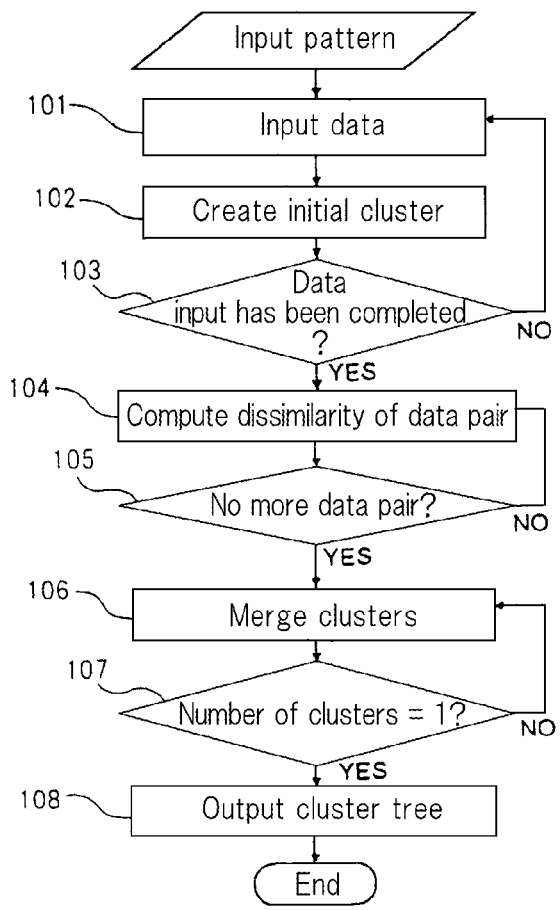
FIG. 3 is a flowchart showing operations of the clustering device according to the second embodiment.

FIG. 3 is a flowchart showing operations of the clustering device according to the second embodiment. Referring to FIG. 3, pattern input section 21A reads D dimensional input data piece by piece and supplies them to cluster tree creation section 21B (at step 101). Cluster tree creation section 21B creates one cluster $C^{(n)}$ corresponding to the input data $X^{(n)}$: n=1, . . . , N (at step 102). The processes of steps 101 to 102 are iterated until N pieces of input data have been processed (at step 103). In this case, a cluster including j pieces of data ($X^{(n_1)}$, . . . $X^{(n_j)}$) is denoted by $C^{(n_1, \cdots, n_j)}$.

After the data input has been completed, cluster tree creation section 21B successively supplies $_NC_2$ sets of cluster pairs ($C^{(m)}$, $C^{(n)}$): 1≤m<n≤N to dissimilarity computation section 21C. Dissimilarity computation section 21C computes dissimilarities F ($C^{(m_1, \cdots, m_i)}$, $C^{(n_1, \cdots, n_j)}$) between cluster pairs ($C^{(m)}$, $C^{(n)}$) supplied from cluster tree creation section 21B and returns dissimilarity values to cluster tree creation section 21B (at step 104). These dissimilarities are successively computed for all data pairs (at step 105).

In this case, it is assumed that dissimilarities between cluster pairs are computed using, for instance, the nearest neighbor method. In the nearest neighbor method, dissimilarities between cluster pairs are computed according to:

[Formula 8]

$$F(C^{(m1,\ldots,mi)}, C^{(n1,\ldots,nj)}) = X \in C^{(m1,\ldots,mi)} \min, \\ Y \in C^{(n1,\ldots,nj)} E^{(D)}(X,Y) \qquad (8)$$

At this point, dissimilarities $E^{(D)}(X, Y)$ between individual pieces of data are computed according to the Formula (5).

Next, cluster tree creation section 21B selects a cluster pair having the lowest dissimilarity from a cluster set and merges these clusters into one cluster (at step 106). In this case, since dissimilarities have been computed according to the Formula (5), when a cluster pair having the lowest dissimilarity is selected, a result with robustness against data missing and outliers can be obtained. In addition, unstability of neighbor determination for high dimensional patterns can be prevented.

Cluster tree creation section 21B iterates operations that cause dissimilarity computation section 21C to re-compute dissimilarities between clusters of a new cluster set, select a cluster pair whose dissimilarity is the lowest, and merge them to one cluster until the number of clusters becomes 1 (at step 107). When the number of clusters becomes 1, cluster tree creation section 21B outputs the obtained cluster tree and completes the processes.

Third Embodiment

In the second embodiment, values obtained according to Formula (5) are used as dissimilarities, whereas in the third embodiment, values obtained according to Formula (4) are used as dissimilarities. With respect to this point, the third embodiment is different from the second embodiment. Like in the first embodiment, in this embodiment, clustering can be performed with robustness against missing values and outliers and can also performed for high dimensional patterns.

Fourth Embodiment

A fourth embodiment is a modification of the second or third embodiment and in the case in which $x^{(1)}_i$ or $x^{(2)}_i$ of the Formula (6) are missing values, since

[Formula 9]

$$p(x_i^{(1)}, x_i^{(2)}) = 1 \quad (9)$$

namely,

[Formula 10]

$$E_i(X^{(1)}, X^{(2)}) = 0 \quad (10)$$

this embodiment is different from the second or third embodiment. Like in the second embodiment, in this embodiment, clustering can be performed with robustness against missing values and outliers and can also be performed for high dimensional patterns.

Fifth Embodiment

A fifth embodiment is a modification of the second to fourth embodiments except that the probability density distribution $q_i(x)$ used to compute $p(x^{(1)}_i, x^{(2)}_i)$ according to the formula (3) is a uniform distribution in the domain of $x_i$. Like in the second to fourth embodiments, in this embodiment, clustering can be performed with robustness against missing values and outliers and can also be performed for high dimensional patterns.

First Example

Next, specific examples of the above-described embodiments will be further described. A first example corresponds to the second embodiment.

In this example, the case that a cluster tree of N pieces of data given as a D dimensional vector is created will be instantiated. Dissimilarities between clusters can be computed by applying a method using a distance scale, for instance, the nearest neighbor method or furthest neighbor method. In this example, an instance using the nearest neighbor method will be described. In addition, in this example, a clustering device structured with a computer will be instantiated.

Figure 4:
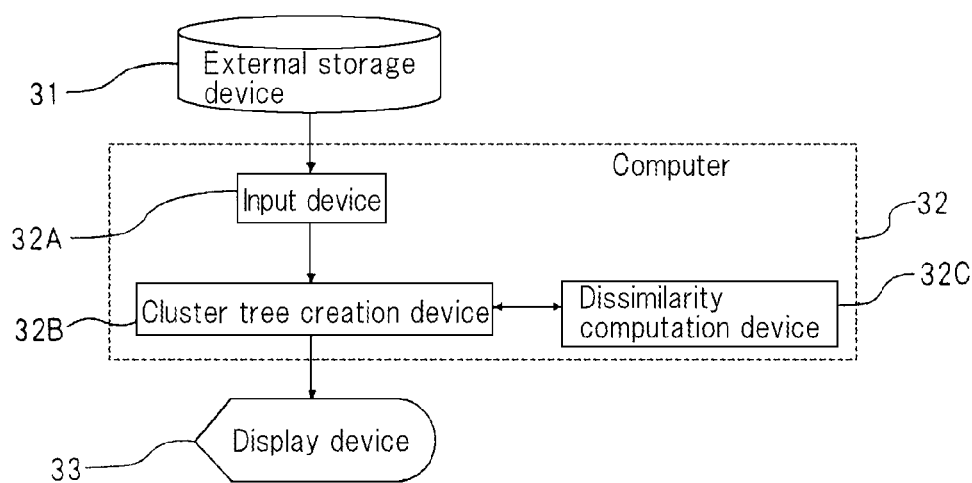
FIG. 4 is a block diagram showing the structure of the clustering device of this example.

FIG. 4 is a block diagram showing the structure of the clustering device according to this example. Referring to FIG. 4, the clustering device is composed of computer 32. Computer 32 has input device 32A, cluster tree creation device 32B, and dissimilarity computation device 32C.

Input device 32A corresponds to pattern input section 21A shown in FIG. 2. Input device 32A reads input data from external storage device 10 and supplies the input data to cluster tree creation device 32B.

Cluster tree creation device 32B corresponds to cluster tree creation section 21B shown in FIG. 2. Cluster tree creation device 32B creates a cluster tree by creating an initial cluster tree from the input data obtained from input device A, causing dissimilarity computation device 32C to set up dissimilarities between clusters, and merging clusters based on the dissimilarities. Then, cluster tree creation device 32B displays the created cluster tree on display device 33.

Dissimilarity computation device 32C corresponds to dissimilarity computation section 21C shown in FIG. 2. Dissimilarity computation device 32C computes dissimilarities from data pair supplied from cluster tree creation device 32B.

In the following, a sequence of operations of computer 32 will be described.

Computer 32 reads N pieces of data stored as a D-dimensional vector in external storage device 31 to cluster tree creation device 32B through input device 32A. Cluster tree creation device 32B creates clusters $C^{(n)}$ corresponding to N pieces of data $X^{(n)}$: $n=1, \ldots, N$.

Next, cluster tree creation device 32B merges a cluster pair $C^{(m1, \ldots, mi)}$ and $C^{(n1, \ldots, nj)}$ having the lowest dissimilarity between clusters F ($C^{(m1, \ldots, mi)}$, $C^{(n1, \ldots, nj)}$) from the cluster set and newly creates a new cluster $C^{(m1, \ldots, mi, ni, \ldots, nj)}$. Cluster tree creation device 32B iterates this operation until the number of clusters becomes 1. Last, cluster tree creation device 32B outputs the obtained cluster tree to display device 33 and then completes the processes.

Second Example

The second example corresponds to the third embodiment. In the first example, values obtained according to the formula (5) are used as dissimilarities, whereas in the second example, values obtained according to the formula (4) are used as dissimilarities. With respect to this point, the second example is different from the first example.

Third Example

The third embodiment is a modification of the first or second example and in the case that $x^{(1)}_i$ or $x^{(2)}_i$ of the formula (6) is a missing value, since

[Formula 11]

$$p(x_i^{(1)}, x_i^{(2)}) = 1 \quad (11)$$

namely,

[Formula 12]

$$E_i(X^{(1)}, X^{(2)}) = 0 \quad (12)$$

this example is different from the first or second example.

Fourth Example

A fourth example is a modification of the first to third examples, and the probability density distribution $q_i(x)$ used to compute $p(x^{(1)}_i, x^{(2)}_i)$ is a uniform distribution in the domain of $x_i$.

Now, the embodiments of the present invention have been described. However, it should be understood by those skilled in the art that the structure and details of the present invention may be changed in various manners without departing from the scope of the present invention.

The present application claims priority based on Japanese Patent Application JP 2008-205456 filed on Aug. 8, 2008, the entire contents of which are incorporated herein by reference in its entirety.

The invention claimed is:

1. A pattern determination device, comprising:
   a probability computation section that computes an internal probability that is a probability in which a value of a predetermined component of a pattern that takes place according to a probability density distribution in a domain of an input pattern falls in a range between the value of said predetermined component of a pattern X (1) and the value of said predetermined component of a pattern X(2);
   a dissimilarity decision section that decides a dissimilarity between said pattern X (1) and said pattern X (2) based on said internal probability computed by said probability computation section; and
   a clustering section that clusters a pattern using said dissimilarity computed by said dissimilarity decision section.

2. The pattern determination device as set forth in claim 1, wherein said probability computation section virtually generates a pattern X (3) according to a probability density distribution that represents a distribution of probabilities in which the value of said predetermined component of the pattern in said domain determines whether or not the value of said predetermined component of said pattern X (3) falls in the range between the value of said predetermined component of said pattern X (1) and the value of said predetermined component of said pattern X (2), and computes said internal probability based on a plurality of determined results.

3. The pattern determination device as set forth in claim 1, wherein said probability computation section computes internal probabilities of the plurality of said predetermined components, and
   wherein said dissimilarity decision section designates a sum of logarithms of the plurality of said internal probabilities as said dissimilarity.

4. The pattern determination device as set forth in claim 1, wherein said probability computation section computes the internal probabilities of the plurality of said predetermined components, and
   wherein said dissimilarity decision section designates a product of the plurality of said internal probabilities as said dissimilarity.

5. The pattern determination device as set forth in claim 1, wherein if a particular component of said pattern X (1) or said pattern X (2) is a missing value, said probability computation section designates the internal probability of the component as a predetermined value.

6. The pattern determination device as set forth in claim 5, wherein said probability computation section designates said predetermined value as 1.

7. The pattern determination device as set forth in claim 1, wherein said probability computation section uses uniform random numbers as said probability density distribution.

8. A pattern determination method, comprising:
   computing an internal probability that is a probability in which a value of a predetermined component of a pattern that takes place according to a probability density distribution in a domain of an input pattern falls in a range between the value of said predetermined component of a pattern X (1) and the value of said predetermined component of a pattern X (2); and
   deciding a dissimilarity between said pattern X (1) and said pattern X (2) based on said internal probability which was computed;
   clustering a pattern using said dissimilarity computed by said deciding of dissimilarity.

9. The pattern determination method as set forth in claim 8, further comprising:
   generating a pattern X (3) according to a probability density distribution that represents a distribution of probabilities in which the value of said predetermined component of the pattern in said domain will be occurred, determining whether or not the value of said predetermined component of said pattern X (3) falls in the range between the value of said predetermined component of said pattern X (1) and the value of said predetermined component of said pattern X (2), and computing said internal probability based on a plurality of determined results.

10. The pattern determination method as set forth in claim 8, further comprising:
    computing internal probabilities of the plurality of said predetermined components, and
    designating a sum of logarithms of the plurality of said internal probabilities as said dissimilarity.

11. The pattern determination method as set forth in claim 8, wherein,
    computing the internal probabilities of the plurality of said predetermined components, and
    designating a product of the plurality of said internal probabilities as said dissimilarity.

12. The pattern determination method as set forth in claim 8, further comprising:
    if a particular component of said pattern X (1) or said pattern X (2) is a missing value, designating the internal probability of the component as a predetermined value.

13. The pattern determination method as set forth in claim 8,
    using uniform random numbers as said probability density distribution.

14. A non-transitory computer readable medium containing a pattern determination program that is executed by a computer and that causes said computer to perform functions, comprising:
    a probability computation section that computes an internal probability that is a probability in which a value of a predetermined component of a pattern that takes place according to a probability density distribution in a domain of an input pattern falls in a range between the value of said predetermined component of a pattern X (1) and the value of said predetermined component of a pattern X(2);
    a dissimilarity decision section that decides a dissimilarity between said pattern X (1) and said pattern X (2) based on said internal probability computed by said probability computation sections; and
    a clustering section that clusters a pattern using said dissimilarity computed by said dissimilarity decision section.

* * * * *